United States Patent [19]

Laney et al.

[11] Patent Number: 5,759,756
[45] Date of Patent: Jun. 2, 1998

[54] CO-EXTRUDED FILM WITH NON-CRYSTALLINE CORE

[75] Inventors: Thomas M. Laney, Hilton; Jehuda Greener; Wen-Li A. Chen, both of Rochester, all of N.Y.

[73] Assignee: Eastman Kodak Company, Rochester, N.Y.

[21] Appl. No.: 752,369

[22] Filed: Nov. 19, 1996

[51] Int. Cl.[6] .................................................. G03C 1/795
[52] U.S. Cl. ........................... 430/527; 430/533; 430/534; 430/535; 428/411.1; 428/480; 428/483
[58] Field of Search ............................. 430/533, 534, 430/535, 531, 527; 428/480, 483, 411.1

[56] References Cited

U.S. PATENT DOCUMENTS

| | | | |
|---|---|---|---|
| 4,011,358 | 3/1977 | Roelofs | 428/480 |
| 4,362,529 | 12/1982 | Mugge et al. | 428/480 |
| 5,258,213 | 11/1993 | Mugge et al. | 428/480 |
| 5,294,473 | 3/1994 | Kawamoto | 430/533 |
| 5,362,570 | 11/1994 | Rober et al. | 428/480 |
| 5,368,997 | 11/1994 | Kawamoto | 430/533 |
| 5,387,501 | 2/1995 | Yajimi et al. | 430/533 |
| 5,567,576 | 10/1996 | Suzuki et al. | 430/533 |

OTHER PUBLICATIONS

W. J. Schrenk and T. Alfrey, Jr., "Coextruded Multilayer Polymer Films and Sheets", Chapter 15, Polymer Blends, pp. 129–165 (1978).

D. Djordjevic, "Coexrusion", Vo. 6, No. 2, 1992, RAPRA Review Reports.

*Primary Examiner*—Richard L. Schilling
*Attorney, Agent, or Firm*—Carl F. Ruoff

[57] ABSTRACT

The present invention is a photographic support including a core layer of a transparent non-crystalline polymer having a glass transition temperature Tg. The core layer has a first surface and a second surface. A first outer layer of a transparent crystalline polymer having a first stretch temperature $Ts_1$ greater than the Tg is superposed on the first surface of said core layer. A second outer layer of a transparent crystalline polymer having a second stretch temperature $Ts_2$ greater than the Tg is superposed on the second surface of said core layer.

12 Claims, 1 Drawing Sheet

CO-EXTRUDED FILM WITH NON-CRYSTALLINE CORE

FIELD OF THE INVENTION

The present invention relates to biaxially oriented photographic film supports with relatively low core set curl.

BACKGROUND OF THE INVENTION

In recent years photographic materials have been required to meet ever increasing product demands. For example, the reduction in the size of cameras, the increase in the film delivery speed upon picture taking and the increase in the magnification. This requires a photographic support having a high strength, a good dimensional stability and a small thickness.

The reduction in the size of cameras accompanies the further demand for smaller cartridges. Because of this, it is necessary that the tensile strength and stiffness of the film be increased so that the thickness of the film can be decreased. Additionally, the film support must resist curl development. Finally, it is also desirable to have a film that resists tearing and this requires an increase in the toughness of the film support.

In order to produce biaxially oriented photographic film supports with low core set curl polymers with relatively high glass transition temperatures (Tgs) must be utilized. Most of the potential polymer candidates for this application, e.g., polyethylene naphthalate (PEN), are relatively expensive as compared to traditional photographic polymers, e.g., polyethylene terephthalate (PET). Although the high Tg polymers are effective in reducing core set curl their high cost increases the unit manufacturing cost of photographic film based on these supports.

The present invention provides a film support with low core set and high tensile strength that is less expensive than prior art supports.

SUMMARY OF THE INVENTION

The present invention is a photographic support comprising a core layer of a transparent non-crystalline polymer having a glass transition temperature (Tg) wherein the core layer has a first surface and a second surface. A first outer layer is superposed on the first surface of the core layer and this comprises a transparent semi-crystalline polymer having a first stretch temperature ($Ts_1$) greater than Tg. A second outer layer is superposed on the second surface of the core. This comprises a transparent semi-crystalline polymer having a second stretch temperature ($Ts_2$) greater than Tg.

The present invention is also a photographic element which includes at least one light-sensitive layer coated on a support. The support comprises a core layer of a transparent non-crystalline polymer having a glass transition temperature (Tg) wherein the core layer has a first surface and a second surface. A first outer layer is superposed on the first surface of the core layer and comprises a transparent semi-crystalline polymer which has a first stretch temperature ($Ts_1$) greater than Tg. A second outer layer is superposed on the second surface of the core layer and this comprises a transparent semi-crystalline polymer which has a second stretch temperature ($Ts_2$), which is greater than the first Tg.

Figure 1:
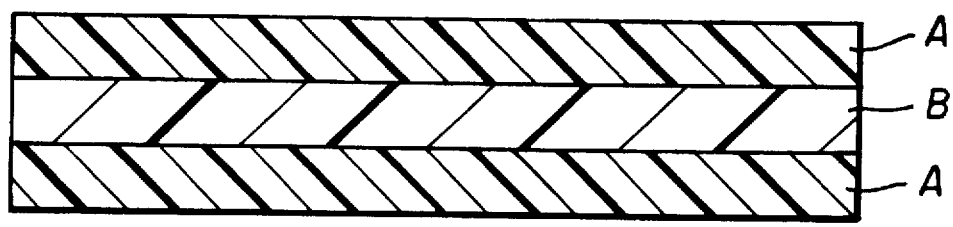
FIG. 1 is a cross-sectional view of the present invention.

For a better understanding of the present invention together with other objects, advantages and capabilities thereof reference is made to the following description and appended in connection with the above-described drawing.

DETAILED DESCRIPTION OF THE INVENTION

In view of above-described problem the present inventors have done extensive studies into the formation of a co-extruded biaxially oriented photographic film support. The basis of the current invention is that core set curl is predominantly controlled by stress relaxation in the layers nearest the outside of a photographic film support while in wound roll form. This presents the opportunity to co-extrude a non-crystallizing polymer in the core of such a film whose Tg is less than the stretching temperature Ts of the outer layers with minimal effect on core set of the film. Accordingly, the stretch temperature is the temperature used in the stretching operation and is typically 10° to 20° C. higher than the Tg of the material. At the stretch temperature the material is compliant and exhibits strain hardening. The stretch temperature is above the glass transition temperature and below the thermal crystallization temperature.

Glass Transition Temperature is determined by heating a sample in a differential scanning calorimeter from about 20° C. to 300° C. at 10° C./min, then quenching back to 20° C. and finally reheating to 300° C. at 10° C./min. The Tg is the midpoint temperature in the first transition of the second thermogram.

There exist polymers meeting this core layer criteria which are much less expensive than the higher Tg low core set polymers. Bending stiffness of films is also predominantly controlled by the material near the free surfaces of the film, and the higher Tg polymers (e.g., PEN or blends of PEN) tend to exhibit higher bending stiffness properties. Therefore, this invention also offers the benefit of providing a biaxially oriented photographic film support with high bending stiffness at a relatively low cost.

PEN referred to in the present invention represents the polymers which are constituted substantially from ethylene-2,6-naphthalate units, but PEN may have a small portion, for example 10 mol % or less, of other units as a third component. PEN can be usually obtained by polycondensing naphthalene-2,6-dicarboxylic acid or its ester-forming alkyl ester with ethylene glycol in the presence of a catalyst under appropriate reaction conditions. As a third component, there can be mentioned, for example, adipic acid, sebacic acid, terephthalic acid, naphthalene-2,7-dicarboxylic acid, tetramethylene glycol, hexamethylene glycol and polyethylene glycol. The inherent viscosity of PEN is preferred to be in the range from 0.5 to 0.8.

Preferred other ingredients include dibasic acids such as isophthalic acid, phthalic acid, phthalic anhydride, succinic acid, oxalic acid, or lower alkyl esters thereof; oxycarboxylic acids such as p-oxybenzoic acid, p-oxyethyloxybenzoic acid or lower alkyl ester thereof; or glycols such as propylene glycol or trimethylene glycol. The hydroxyl or carboxyl group at the end portion of the polyethylene naphthalate may be terminated with a monofunctional compound such as benzoic acid, benzylbenzoic acid, benzyloxybenzoic acid, or methoxypolyalkylene glycol. Otherwise, the polyethylene naphthalate may be denatured with a slight amount of 3 or 4 functional compounds such as grycerol or pentaerythritol. U.S. Pat. Nos. 5,294,473 and 5,368,997 and USSN 08/574, 471 filed Dec. 19, 1995 broadly describe copolyesters with PEN and other polymers.

The polyester film (PEN or blend of PEN) according to the present invention refers to a biaxially oriented photographic film which can be formed by biaxially stretching PEN as the starting material by any known method. That is, PEN or PEN blend is dried, melt extruded at 280° to 320° C., quenched and solidified to obtain a substantially amorphous unoriented cast sheet. Then the amorphous unoriented sheet is stretched 2–5 times in the machine direction at 120°–170° C., and 2–5 times in the transverse direction at 120°–170° C. Biaxial stretching can be sequential or simultaneous. After stretching, the film base is heat set at a temperature of from 200° to 250° C. for a time of from 0.1 to 10 seconds. If the film base is annealed, it can be annealed at a temperature of from 50° C. up to the lowest Tg of one of the outer layers of film base of the present invention. Typical annealing conditions for a film base containing a PEN layer are temperatures of from 90° to 125° C. for times of 6 to 120 hours.

The polyethylene 2,6-naphthalate films having the clear non-crystallizing polymer at the core referred to in the present invention are those obtained in the manner described above and have a thickness of 50 to 180 μm.

The present invention involves producing a PEN film (or any other high Tg low core set photographic support) as described above while co-extruding a clear, non-crystallizing polymer at the core of said film. The Tg of said core polymer should be less than the stretching temperature of the low core set polymer. Any one of the known techniques for co-extruding cast sheet can be employed. Typical co-extrusion technology is taught in W. J. Schrenk and T. Alfrey, Jr. "Coextruded Multilayer Polymer Films and Sheets", Chapter 15, *Polymer Blends*, P. 129–165, 1978, Academic Press and D. Djordjevic, "Coextrusion", Vol. 6, No. 2, 1992 *Rapra Review Reports*.

The core polymer is a noncrystallizable polyester, copolyester or blend of polyesters and copolyesters. For example, copolyesters of terephthalic acid, isophthalic acid, ethylene glycol and 1,4 cyclohexanedimethanol form noncrystallizable polymers suitable as the core polymer of the present invention. These include poly(1,4 cyclohexylene dimethylene terephthalate) with different amounts of glycol and 1,4 cyclohexanedimethanol. PETG 6763 and PCTG 5445 are two polymers with Tg's of 81° C. and 88° C., respectively available from Eastman Chemical Company which meet these criteria. It is also necessary that the core polymer be compatible with PEN. That is delamination of the layers does not occur. Polyesters such as PETG and PCTG are compatible with PEN. Polymers which crystallize (eg., PET) are not a suitable core material as they haze at the high stretch temperatures required for PEN and other high Tg materials. Other suitable examples of noncrystallizable polymers with a Tg lower than that of PEN include styrenics (e.g., polystyrene, styrene-acrylonitrile copolymer, styrene-methyl methacrylate copolymer) acrylics (e.g., polymethylmethacrylate, acrylonitrile-butadiene-styrene copolymer, polyacrylonitrile) and coplyesters comprising mixtures of ethylene glycol and 1,4 cyclohexane dimethanol with terephthalic acid and isophthalic acid. It is also possible to include a tie layer between the core layer and outer surface layer. Such a tie layer must be compatible with both the core layer polymer and outer layer polymer.

The support of the present invention may be treated with corona discharge (CDT), UV, glow discharge (GDT), flame or other such methods that enhance adhesion of the support surface. The preferred method is the glow discharge treatment as described in U.S. Pat. No. 5,425,980 incorporated herein by reference.

Coextruded film base of the present invention having the non-crystalline polymer core can contain other components commonly found in film supports for photographic elements. These include dyes, lubricants and particles of organic and inorganic materials such as glass beads. These are described in more detail in *Research Disclosure*, February 1995, Item 37038, pages 79–114.

Film base prepared according to the present invention can bear layers commonly found on film support used for photographic elements. These include magnetic recording layers, subbing layers between other layers and the support, photosensitive layers, interlayers and overcoat layers, as are commonly found in photographic elements. These layers can be applied by techniques known in the art and described in the references cited in *Research Disclosure*, Item 37038 cited above.

Magnetic recording layers that can be used in photographic elements of this invention are described in U.S. Pat. Nos. 3,782,947; 4,279,975; 5,147,768; 5,252,441; 5,254,449; 5,395,743; 5,397,826; 5,413,902; 5,427,900; 5,432,050; 5,434,037; 5,436,120; in *Research Disclosure*, November 1992, Item 34390, pages 869 et seq., and in Hatsumei Kyonkai Gihou No. 94-6023, published Mar. 15, 1995, by Hatsumei Kyoukai, Japan.

Photographic elements of this invention can have the structure and components shown in *Research Disclosure*, Item 37038 cited above and can be imagewise exposed and processed using known techniques and compositions, including those described in the *Research Disclosure* Item 37038 cited above.

The following examples further illustrate the invention.

EXAMPLES

A co-extruded photographic film support was produced via the method described above. FIG. 1 shows a cast sheet whose cross section forms an A-B-A configuration and whose total thickness is nominally 1.25 mm. Simultaneously PEN resin (A in FIG. 1) and PETG resin (B in FIG. 1) are dried and extruded from an extruder. Cast sheets are formed with layer ratios of 1:1:1 and 1:2:1. The cast sheets are biaxially stretched 3.8 times in both the machine and transverse directions. The machine direction stretch is done at a stretch temperature of 135° C. while the tranverse direction stretch is done at 140° C. The films are then heatset at a temperature of 200° C. An all PEN comparison sample is produced in the same manner as described above.

Samples of the two co-extruded films and the all PEN film are collected. Core set curl is measured by the following technique for all three samples.

Six lengthwise strips 150 mm ×35 mm were cut from each of the films prepared above. The strips were conditioned at 21° C./50% relative humidity overnight and their curl was measured according to Test Method A in ANSI P41.29-1985. The results are reported in terms of 1/R, m$^{-1}$, where R is the radius of curvature of the curled film.

Five lengthwise and five widthwide strips 150 mm×15 mm were cut from each of the films prepared above. A Sintech tensile tester (available from Sintech Inc. 378 Page St., Stoughton, Mass. 02072) was used to measure representative tensile properties in accordance with ASTM D882. The properties measured (and the units in which they are reported in Table 1) are: tensile modulus (psi), yield stress (ksi) and break stress (ksi).

Five lengthwise and five widthwide strips 75 mm×25 mm were cut from each of the film bases prepared above and tested in accordance with ASTM D1938. Tear strength is reported as the force (g) needed to propagate the tear.

Three lengthwise and three widthwise strips 15 mm×69 mm were cut from each of the film bases prepared above. One edge of each strip was secured and the other edge was bent at ¾ of an inch from the secured edge and stiffness (lbs-inch$^2$/inch) was measured on a Lorentzen and Wettre Bending Resistance Tester based on the load at a deflection of 15° from reference.

The following winding conditions were used in the core-set tests. The film base was held at 80° C./50%RH for 2 hrs on a 7 mm diameter core. Annealing conditions for the samples that were annealed were 100° C. for 24 hours.

TABLE 1

Physical Properties of PEN vs PEN/PETG/PEN Support

| | | PEN | PEN/ PETG/ PEN (1./1./1) | PEN/ PETG/ PEN (1./2./1.) |
|---|---|---|---|---|
| Core Set, 1/m 80 C./2 Hr/ 7 mm | w/o Annealing | 174 | 176 | 182 |
| | Std. Dev. | 5.1 | 7.5 | 5.5 |
| | w/Annealing | 101 | 97 | 94 |
| | Std. Dev. | 4.7 | 2 | 3.1 |
| Stiffness (normalized 3.5 mils (lb-in2/in) | w/o Annealing MD | 0.004 | 0.003 | 0.003 |
| | Std. Dev. | 0.0004 | 0.0008 | 0.0005 |
| | w/o Annealing TD | 0.0035 | 0.004 | 0.0037 |
| | Std. Dev. | 0.0002 | 0.0003 | 0.0003 |
| Modulus ($\times 10^{-5}$ psi) | w/o Annealing MD | 10.1 | 7.6 | 6.6 |
| | Std. Dev. | 0.1 | 0.1 | 0.1 |
| | w/o Annealing TD | 10.5 | 8.8 | 7.5 |
| | Std. Dev. | 0.4 | 0.1 | 0.01 |
| Yield Stress (ksi) | w/o Annealing MD | 21.5 | 16.6 | 14.2 |
| | Std. Dev. | 0.25 | 0.12 | 0.17 |
| | w/o Annealing TD | 24.4 | 19.1 | 16.4 |
| | Std. Dev. | 0.62 | 0.22 | 0.07 |
| Break Stress (ksi) | w/o Annealing MD | 36.5 | 27.2 | 21.2 |
| | Std. Dev. | 2.28 | 0.61 | 1.17 |
| | w/o Annealing TD | 36.3 | 27.2 | 21.2 |
| | Std. Dev. | 2.28 | 0.61 | 1.17 |
| Tear Strength (normalized 3.5 mils) (grams) | w/o Annealing MD | 39.6 | 60 | 78.4 |
| | Std. Dev. | 2 | 7 | 8 |
| | w/Annealing TD | 36.1 | 63.3 | 78.3 |
| | Std. Dev. | 5 | 5 | 3 |

The standard deviation for each measurement is shown as well. The core set curl is statistically the same for all three films. Bending stiffness, measured in both the machine direction (MD) and transverse direction (TD), is also shown to be statistically the same for all three films. The other physical properties measured are tensile properties which are measured in the machine and transverse directions. In all cases the tensile property diminished with increasing amounts of PETG 6763 at the core as would be expected. A balance of maintaining these properties versus the thickness of a less expensive core layer must be made for any specific application.

Photographic elements are prepared by coating the following layers in order on the coextruded support of the present invention that has been nitrogen glow discharge treated (70 mT, 0.75 kW, 50 fpm for a 13 inch wide A-B-A support).

Layer 1) A gelatin/poly(n-butyl acrylate-co-2-aminoethyl methacrylate hydrochloride-co-2-hydroxyethyl methacrylate (50/5/45), (hereinafter referred to as polymer P-1), subbing layer with 2 wt % chrome alum and 0.1% (by wt of total solution mass) Saponin as surfactant are coated from water. The coating solutions are applied using a coating hopper and dried for a time sufficient to remove water.

The following layers in the given sequence are applied to the supports as described above. The quantities of silver halide are given in grams of silver per m$^2$. The quantities of other materials are given in g per m$^2$.

Layer 2 {Antihalation Layer} black colloidal silver sol containing 0.236 g of silver, with 2.44 g gelatin.

Layer 3 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 4 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming masking coupler CM-1 at 0.022 g, DIR compound D-1 at 0.011 g, with gelatin at 1.66 g.

Layer 5 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 6 {Interlayer} Yellow dye material YD-1 at 0.11 g and 1.33 g of gelatin

Layer 7 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler MM-1 at 0.067 g with gelatin at 1.78 g.

Layer 8 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 9 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 10 {Interlayer} Yellow dye material YD-2 at 0.11 g with 1.33 g gelatin.

Layer 11 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 12 {Second (more) Blue-Sensitive Layer} Blue sensitized silver iodobromide emulsion [4 mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-1 0.022 g, DIR compound D-5 at 0.05 g, BAR compound B-1 at 0.006 g with gelatin at 1.97 g.

Layer 13 {Protective Layer} 0.111 g of dye UV-1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The structural formulae for the components identified above by letter abbreviation are as follows:

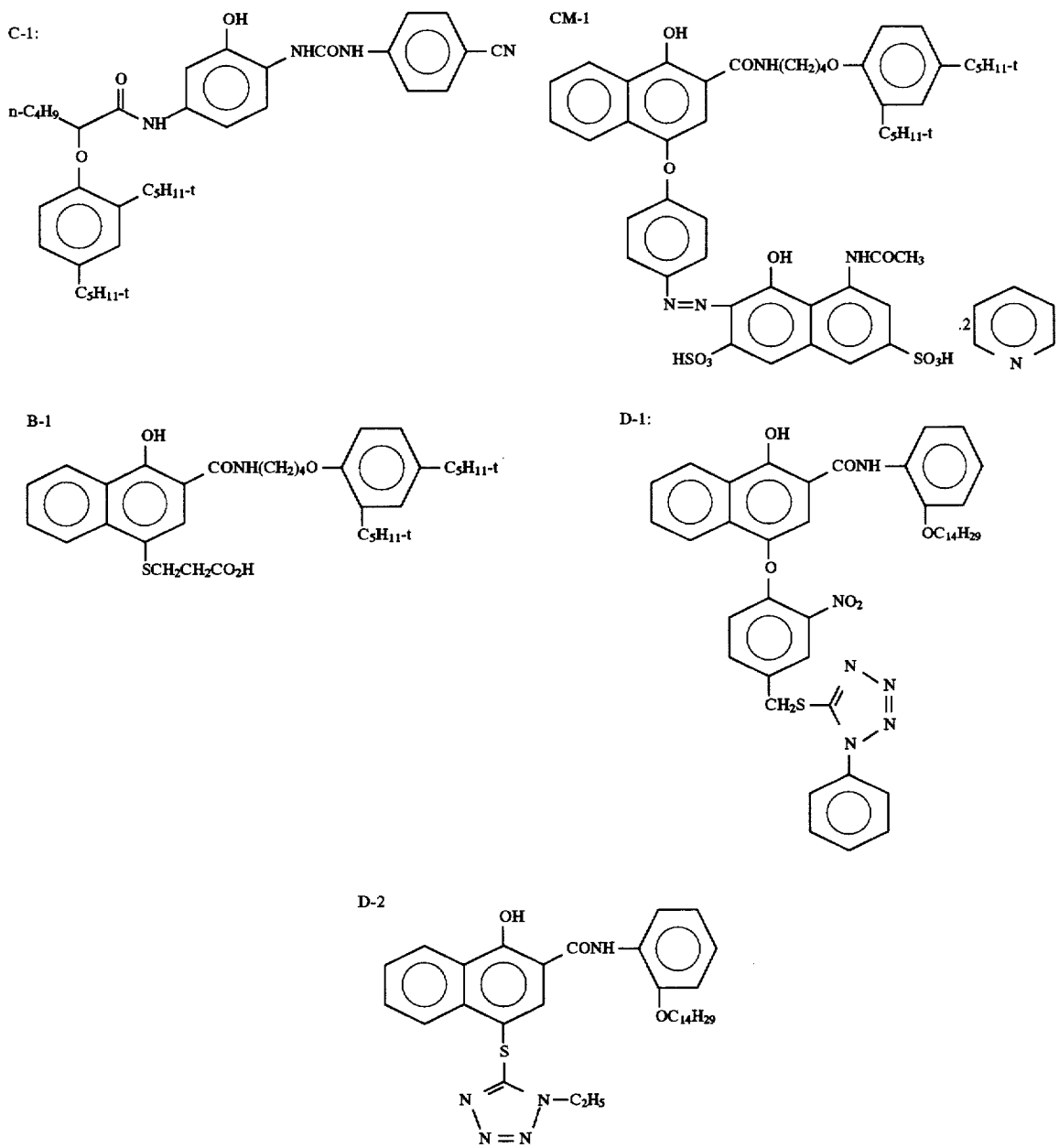

D-3:
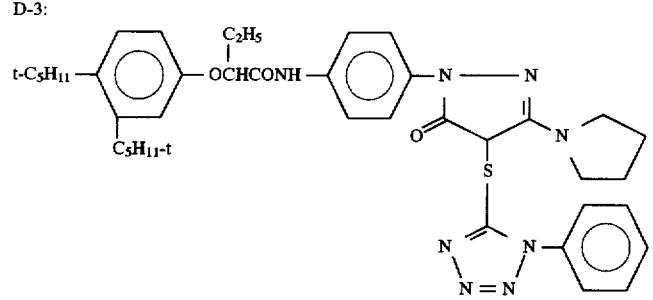
D-4
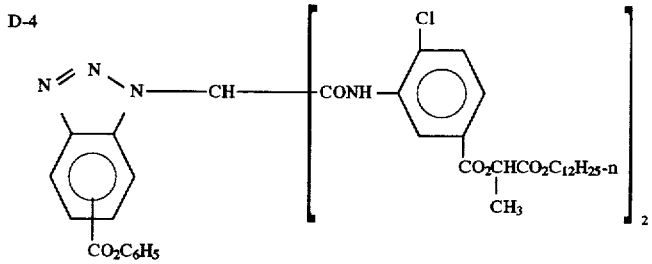
D-5:
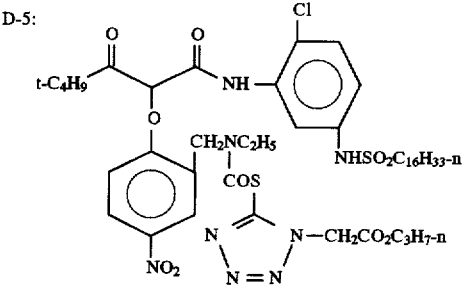
MM-1
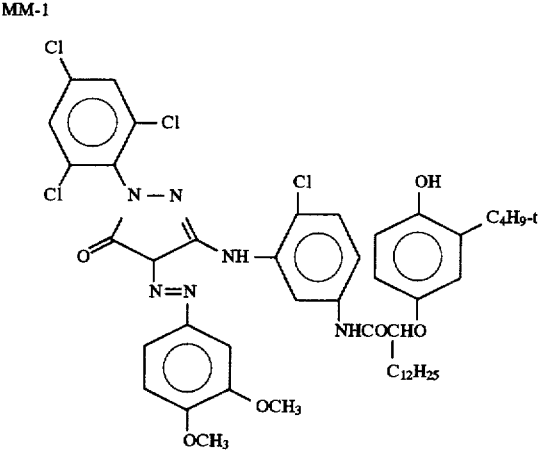
Y-1:
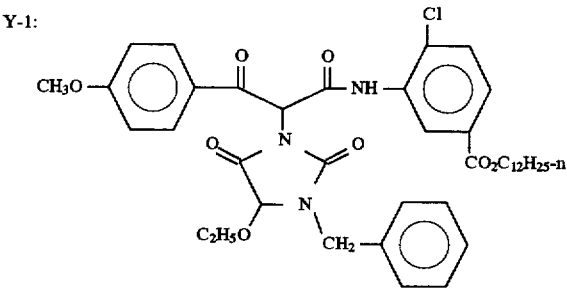
Y-2:
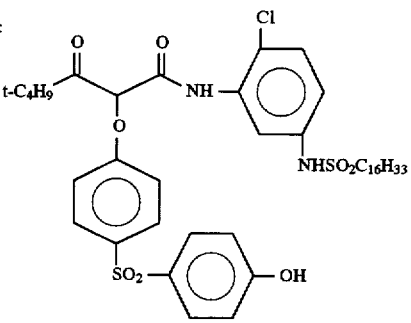

M-1:

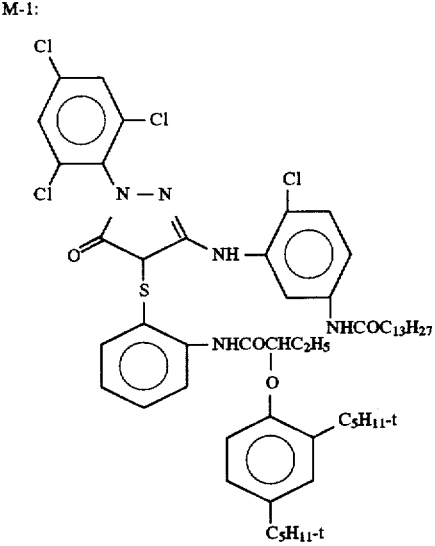

YD-1:

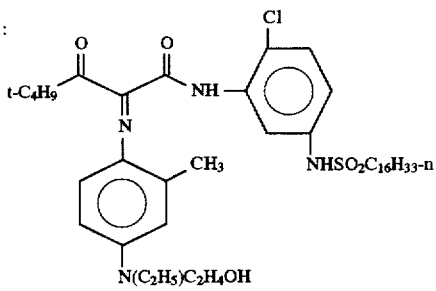

YD-2:

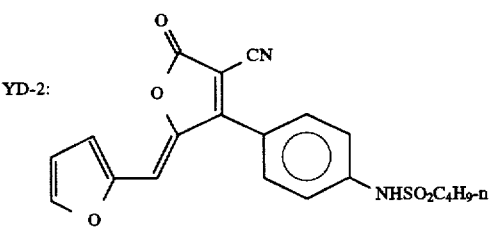

UV-1:

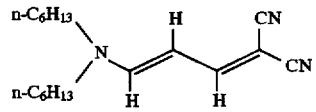

UV-2:

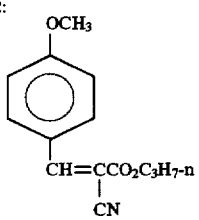

H-1:   CH₂(SO₂CH=CH₂)₂

The surface of the support opposite that bearing the subbing layer can contain magnetic recording layers, antistatic layers, subbing layers, lubrication layers, and the like, as described in U.S. Pat. No. 5,514,528, the disclosure of which is incorporated herein by reference.

The invention has been described in detail with particular reference to certain preferred embodiments thereof, but it will be understood that variations and modifications can be effected within the spirit and scope of the invention.

What is claimed is:

1. A photographic film support comprising:
    a core layer comprising a transparent non-crystalline polyester having a glass transition temperature Tg, the core layer having a first surface and a second surface,
    a first outer layer superposed on the first surface of said core layer comprising a transparent crystalline polyester having a first stretch temperature $Ts_1$ greater than the Tg,
    a second outer layer superposed on the second surface of said core layer comprising a transparent crystalline polyester having a second stretch temperature $Ts_2$ greater than the Tg.

2. The photographic support according to claim 1, wherein the core layer comprises poly(1,4-cyclohexylene dimethyhlene terephthalate).

3. The photographic support according to claim 1, wherein the first outer layer comprises polyethylene naphthalate.

4. The photographic support according to claim 1, wherein the second outer layer comprises polyethylene naphthalate.

5. The photographic film support of claim 1 that has been annealed at a temperature in the range of 50° C. up to a lowest glass transition temperature of the outer layers for a period of 0.1 to 1000 hours.

6. The photographic support according to claim 1, further comprising:
    a tie layer between the core layer and the first outer layer.

7. The photographic support according to claim 1, further comprising a tie layer between the core layer and the second outer layer.

8. The photographic support according to claim 1, wherein the glass transition temperature, Tg, is greater than 50° C.

9. A photographic element comprising:
    at least a light-sensitive layer coated on a support comprising a transparent non-crystalline polymer having a glass transition temperature, Tg, the core layer having a first surface and a second surface, a first outer layer superposed on the first surface of said core layer comprising a transparent crystalline polyester having a first stretch temperature $Ts_1$ greater than the Tg, a second outer layer superposed on the second surface of said core layer comprising a transparent crystalline polyester having a second stretch temperature $Ts_2$ greater than the Tg.

10. The photographic element according to claim 9, further comprising:

an antistatic layer.

11. The photographic element according to claim 9, further comprising:

a transparent magnetic recording layer.

12. The photographic film base of claim 9 that has been annealed at a temperature in the range of 50° C. up to a lowest glass transition temperature of the outer layers for a period of 0.1 to 1000 hours.

* * * * *